United States Patent
Dennerlein et al.

(10) Patent No.: US 10,282,872 B2
(45) Date of Patent: May 7, 2019

(54) NOISE REDUCTION IN TOMOGRAMS

(71) Applicant: Siemens Aktiengesellschaft, Munich (DE)

(72) Inventors: Frank Dennerlein, Forchheim (DE); Matthias Goldammer, Munich (DE); Michael Schrapp, Munich (DE); Karsten Schoerner, Munich (DE); Juergen Stephan, Puchheim (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 283 days.

(21) Appl. No.: 15/303,071

(22) PCT Filed: Mar. 24, 2015

(86) PCT No.: PCT/EP2015/056272
§ 371 (c)(1),
(2) Date: Oct. 10, 2016

(87) PCT Pub. No.: WO2015/154990
PCT Pub. Date: Oct. 15, 2015

(65) Prior Publication Data
US 2017/0032547 A1     Feb. 2, 2017

(30) Foreign Application Priority Data
Apr. 8, 2014 (DE) .................. 10 2014 206 720

(51) Int. Cl.
*G06T 11/00* (2006.01)
*G06T 5/00* (2006.01)
(Continued)

(52) U.S. Cl.
CPC ........... *G06T 11/008* (2013.01); *G06T 5/002* (2013.01); *G06T 5/20* (2013.01); *G06T 5/50* (2013.01);
(Continued)

(58) Field of Classification Search
USPC .................................................. 382/128, 131
See application file for complete search history.

(56) References Cited

U.S. PATENT DOCUMENTS

| 6,035,012 A | 3/2000 | Hsieh | ................................. 378/4 |
| 7,136,450 B2 * | 11/2006 | Ying | ...................... A61B 6/032 378/7 |

(Continued)

FOREIGN PATENT DOCUMENTS

| CN | 1235811 A | 11/1999 | ............... A61B 6/03 |
| CN | 101028195 A | 9/2007 | ............... A61B 6/00 |

(Continued)

OTHER PUBLICATIONS

Sidky, Emil Y. et al., "Accurate Image Reconstruction form Few-Views and Limited-Angle Data in Divergent-Beam CT," Journal of X-Ray Science and Technology, vol. 14, pp. 119-139, dated Mar. 30, 2006.
(Continued)

*Primary Examiner* — Ishrat I Sherali
(74) *Attorney, Agent, or Firm* — Slayden Grubert Beard PLLC

(57) ABSTRACT

A method is provided for reducing noise in a tomogram and/or volume rendering of at least one object. The noise can occur when scattered radiation artifacts are corrected. At least one tomogram that is affected by scattered radiation and at least one preliminary tomogram that has been corrected by a defined correction method are produced from a plurality of projection image datasets that are affected by scattered radiation. The noise emerging when scattered radiation artifacts are corrected may be reduced by selectively smoothening the noise using a filter based on an edge contour of the at least one object, which contour is rendered in the tomogram that is affected by scattered radiation.

13 Claims, 3 Drawing Sheets

(51) Int. Cl.
*G06T 5/20* (2006.01)
*G06T 5/50* (2006.01)

(52) U.S. Cl.
CPC .. *G06T 11/005* (2013.01); *G06T 2207/10081* (2013.01); *G06T 2207/20012* (2013.01); *G06T 2207/20192* (2013.01)

(56) References Cited

U.S. PATENT DOCUMENTS

| | | | | |
|---|---|---|---|---|
| 7,860,208 | B2 * | 12/2010 | Haerer | G06T 5/002 378/7 |
| 8,233,586 | B1 | 7/2012 | Boas | 378/4 |
| 8,494,248 | B2 * | 7/2013 | Souza | G06T 5/002 382/131 |
| 8,768,037 | B2 | 7/2014 | Kruschel et al. | 382/132 |
| 9,367,903 | B2 | 6/2016 | Goldammer et al. | |
| 9,984,478 | B2 * | 5/2018 | Westerhoff | G06T 11/008 |
| 2006/0083351 | A1 * | 4/2006 | Lamberty | A61B 6/00 378/86 |
| 2007/0086561 | A1 | 4/2007 | Bruder et al. | 378/7 |
| 2007/0268997 | A1 * | 11/2007 | Zhu | A61B 6/5282 378/7 |
| 2008/0013673 | A1 * | 1/2008 | Ruhmschopf | A61B 6/482 378/7 |
| 2008/0069294 | A1 | 3/2008 | Wigstrom et al. | 378/4 |
| 2008/0080663 | A1 * | 4/2008 | Haerer | G06T 5/002 378/7 |
| 2009/0252430 | A1 | 10/2009 | Hou et al. | 382/254 |
| 2011/0116594 | A1 | 5/2011 | Yamakawa et al. | 378/19 |
| 2012/0177267 | A1 | 7/2012 | Chen et al. | 382/131 |
| 2014/0056503 | A1 | 2/2014 | Shechter | 382/131 |
| 2017/0065241 | A1 * | 3/2017 | Hoernig | A61B 6/025 |

FOREIGN PATENT DOCUMENTS

| | | | |
|---|---|---|---|
| CN | 103186888 A | 7/2013 | G06T 5/00 |
| DE | 102006046191 A1 | 4/2008 | A61B 6/03 |
| DE | 102011088265 A1 | 6/2013 | A61B 6/02 |
| WO | 2012/130754 A1 | 10/2012 | A61B 6/03 |
| WO | 2015/154990 A1 | 10/2015 | G06T 11/00 |

OTHER PUBLICATIONS

LaRogue, Samuel J. et al., "Accurate Image Reconstruction from Few-View and Limited-Angle Data in Diffraction Tomography," Journal of Optical Society of America, 25(7), pp. 1772-1782, dated Jul. 2008.

Zhu, Lei et al., "Noise Suppression in Scatter Correction for Cone-Beam CT," Med Phys., 36(3), pp. 741-752, dated Dec. 11, 2008.

Schrapp, Michael et al., "Improvement of Image Quality in Computed Tomography via Data Fusion," Proceedings of the Conference on Industrial Computed Tomography, pp. 283-289, dated Feb. 25, 2014.

German Office Action, Application No. 102014206720.0, 8 pages, dated Nov. 13, 2014.

International Search Report and Written Opinion, Application No. PCT/EP2015/056272, 19 pages, dated Sep. 9, 2015.

Wang, Jun et al., "Metal Artifact Reduction in CT Using Fusion Based Prior Image," Medical Physics, vol. 40, No. 8, 18 pages, dated Jun. 30, 2014.

Chinese Office Action, Application No. 201580030342.0, 6 pages, dated Aug. 24, 2018.

* cited by examiner

NOISE REDUCTION IN TOMOGRAMS

CROSS-REFERENCE TO RELATED APPLICATIONS

This application is a U.S. National Stage Application of International Application No. PCT/EP2015/056272 filed Mar. 24, 2015, which designates the United States of America, and claims priority to DE Application No. 10 2014 206 720.8 filed Apr. 8, 2014, the contents of which are hereby incorporated by reference in their entirety.

TECHNICAL FIELD

The invention relates to a method for reducing noise in a tomogram and/or volume rendering of an object, such as e.g. a component or an organ in the human body. Here, it is necessary to distinguish between the noise on the one hand and, on the other hand, stray radiation artifacts and structures of the object to be rendered. The basis for the correction are a plurality of stray radiation afflicted projection image data records, as may have been generated, for example, by a computed tomography scanner.

BACKGROUND

In x-ray computed tomography (CT), noise and stray radiation may cause significant artifacts in the reconstructed tomogram or digital volume model of the object. A number of methods for correcting stray beams use the difference-based approach, in which measurements or simulations are used to establish which stray radiation artifacts are situated in the individual projection image data records. The measured or simulated stray signal, i.e. the stray component in the projections, is then subtracted from the individual projection images. However, the stray radiation corrected projection images have a lower signal-to-noise ratio (SNR) and lead to significantly larger image noise in the subsequent reconstruction, i.e. during calculation of a tomogram or volume model. The described, subtraction-based a posteriori correction of the stray radiation may, for example, be based on a Monte Carlo simulation, first order deterministic calculations of the radiation or convolution algorithms based on point spread functions. By way of example, the distribution of the stray component on the radiation detector may be measured on the basis of phantom bodies.

The known methods are disadvantageous in that only the large area, i.e. spatially low-frequency, stray signal can be estimated and the signal-to-noise ratio becomes worse, i.e. reduces, in the corrected projections as a result of forming the difference between the measured signal and stray signal. This has a visible effect on the reconstructed tomogram or volume model, as a result of which the detailed identifiability of structures in the imaged object may be lost. This structure information may include important primary information, which should be maintained when the stray radiation artifacts are reduced in a tomogram or volume rendering of the object.

SUMMARY

One embodiment provides a method for reducing noise in a tomogram and/or volume rendering of an object, wherein, in the method, at least one tomogram afflicted by stray radiation and having stray radiation artifacts, and at least one preliminary tomogram corrected in terms of stray radiation by means of a predetermined correction method are formed from a plurality of projection image data records afflicted by stray radiation, characterized in that the noise in the at least one tomogram corrected in terms of stray radiation or in an artifact map describing the stray radiation artifacts is selectively smoothed by means of a filter on the basis of an edge profile of the object imaged in the tomogram afflicted by stray radiation.

In one embodiment, the noise in the at least one tomogram corrected in terms of stray radiation is smoothed and the smoothing is carried out in a region-specific manner by means of an adaptive filter in a manner dependent on the edge profile.

In one embodiment, a smoothing mask is generated for adapting the filter, which smoothing mask predetermines the degree of smoothing for a plurality of different voxels of the at least one tomogram corrected in terms of stray radiation.

In one embodiment, the smoothing mask is formed from gradient values of each tomogram afflicted by stray radiation and/or each tomogram corrected in terms of stray radiation.

In one embodiment, the artifact map is formed on the basis of the tomogram afflicted by radiation and the tomogram corrected in terms of stray radiation, and the noise in the artifact map is smoothed.

In one embodiment, the tomogram afflicted by stray radiation and the tomogram corrected in terms of stray radiation are subtracted from one another for the purposes of forming the artifact map and, after smoothing, a noise-reduced and stray-radiation-corrected new tomogram is formed by subtracting the filtered artifact map from the tomogram afflicted by stray radiation.

In one embodiment, the artifact map is obtained from the projection image data records of preceding measurements or from a data record that differs from the projection image data records, in particular a construction data record of a computed tomography scanner.

In one embodiment, the filter is a total variance filter.

In one embodiment, a subtraction-based stray radiation correction, in which an estimated stray signal is subtracted from the projection image data records, is used as correction method for forming the at least one tomogram corrected in terms of stray radiation.

In one embodiment, the tomogram corrected in terms of stray radiation is formed by means of an iterative reconstruction method on the basis of the projection image data records, and smoothed in a plurality of, or all, iterations by means of the adaptive filter.

In one embodiment, an algebraic reconstruction algorithm (ART) method or a simultaneous algebraic reconstruction algorithm (SART) method or a statistical method is used as iterative reconstruction method.

In one embodiment, the tomograms are gathered from a stray radiation afflicted and stray radiation corrected volume model of the object.

Another embodiment provides a computed tomography scanner comprising a ray source for passing radiation through an object from different projection angles and comprising a ray detector for detecting the rays and producing a plurality of projection image data records of the trans-illuminated object, characterized by an analysis device which is configured to carry out a method as disclosed herein based on the projection data records.

BRIEF DESCRIPTION OF THE DRAWINGS

Example aspects and embodiments of the invention are described below with reference to the drawings, in which.

DETAILED DESCRIPTION

Figure 1:
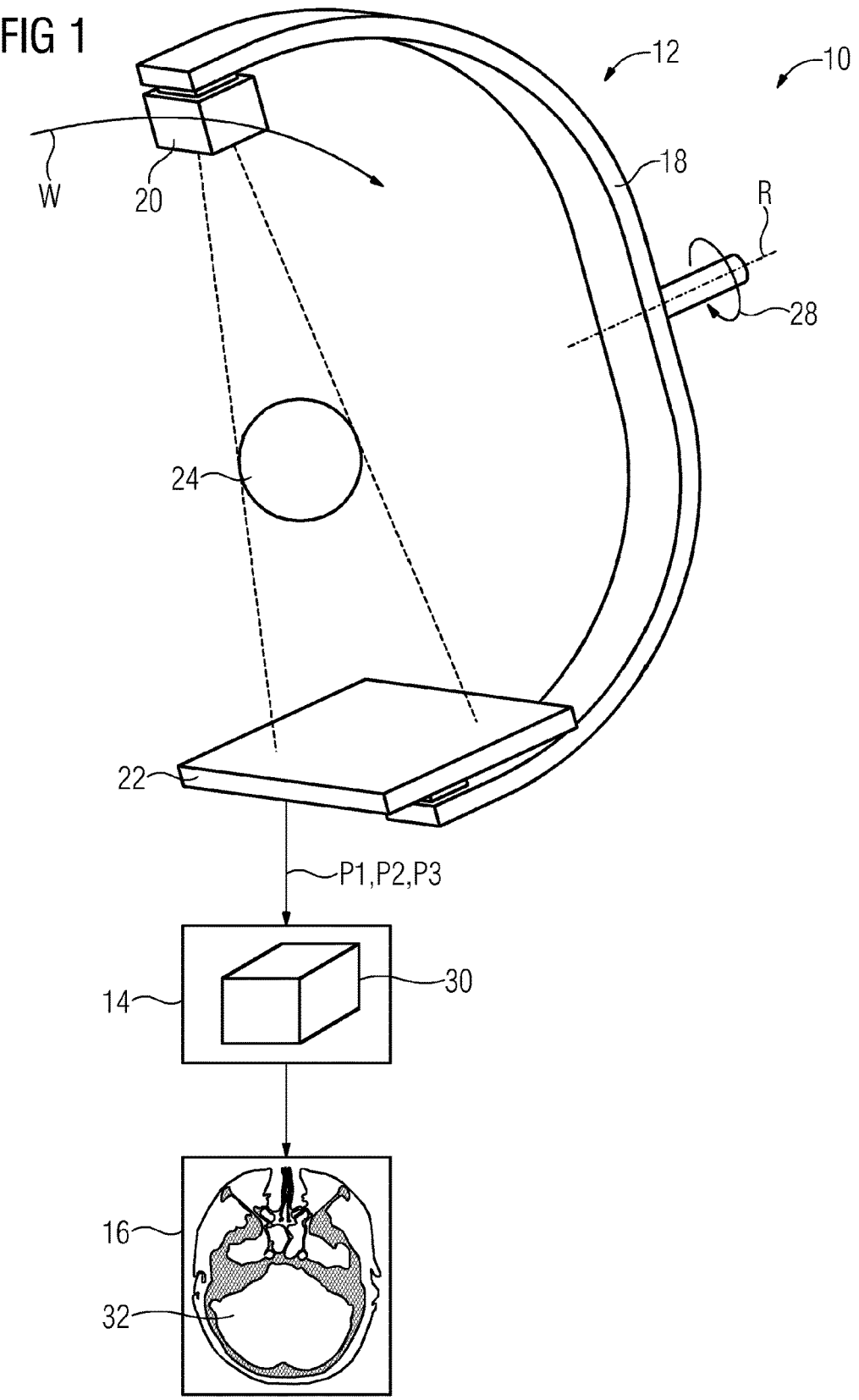
FIG. 1 shows a schematic illustration of an embodiment of the computed tomography scanner according to the invention.

Embodiments of the invention may reduce noise arising or occurring during the correction of stray radiation artifacts.

According to embodiments of the invention, the assumption is made of the plurality of projection image data records afflicted by stray radiation, as described at the outset. Here, afflicted by stray radiation means afflicted by stray radiation artifacts or, expressed differently, afflicted by artifacts. Here, each projection image data record can respectively represent a projection of the object from, in each case, a different projection angle and can comprise 2D projection data in respect of individual pixels of the projection image. By way of example, such projections can be produced by an x-ray C-arm computed tomography scanner. In the disclosed method, at least one tomogram afflicted by stray radiation is formed from such stray radiation afflicted projection image data records. In other words, the stray beam portion is initially maintained or ignored and the projection image data records are combined or linked to form an individual tomogram or a plurality of tomograms, i.e. a volume model. By way of example, this can be obtained by the known back projection or the Feldkamp algorithm. Additionally, at least one preliminary tomogram corrected in terms of stray radiation is formed by means of a predetermined correction method, for example a predetermined correction method as described at the outset (e.g. beam hardening) and known from the prior art. In other words, a first correction is undertaken on the individual projection image data records which during subsequent reconstruction, in the manner described at the outset, leads to tomograms corrected in terms of stray radiation which have a lower SNR, i.e. more significant noise.

The noise in the at least one tomogram corrected in terms of stray radiation or in an artifact map describing the stray radiation artifacts may be selectively smoothed by means of a filter on the basis of an edge profile of the object imaged in the tomogram afflicted by stray radiation. This is advantageous in that the primary information from the at least one tomogram afflicted by stray radiation is used, where said primary information is available with a better SNR than after the stray radiation correction. In the context of the invention, the edge profile means, in general, the structure of the object imaged by means of the projection image data records, i.e. both an outer boundary and edge profiles within the object. In the context of the invention, smoothing should be understood to mean a reduction of the spatial or positional brightness dynamics, i.e. low pass filtering of the local or spatial frequency of the brightness profile. The object can be e.g. an organ or a plurality of organs of a human or animal body, or a component of a material sample.

In one embodiment, for the purposes of smoothing the noise, the tomogram corrected in terms of stray radiation is smoothed in a region-specific manner by means of an adaptive filter in a manner dependent on the edge profile. Here, region specific means that regions in the tomogram corrected in terms of stray radiation, in which edges which are present due to the structure of the object are situated, are smoothed less strongly than homogeneous regions, in which no edges, or only a few structure-related edges, are present so that e.g. stray radiation artifacts dominate.

This first variant is advantageous in that adaptive smoothing of the tomogram corrected in terms of stray radiation is provided, said smoothing also using the structure information from the at least one uncorrected tomogram, i.e. the at least one tomogram afflicted by stray radiation. Compared to methods which only use the corrected data record as a basis of the filtering for noise suppression, an edge detection may also be achieved in image parts with a low contrast-to-noise ratio or SNR, since the uncorrected volume or tomogram has a significantly lower noise, and so structure information can be used and identified more reliably.

Any filter whose degree of smoothing can be set by way of one or more parameters may be used as an adaptive filter. A total variance filter, by means of which a three-dimensional volume model of the object can also be smoothed using three-dimensional structure information about the object, was found to be particularly suitable.

In order to be able to control the adaptive filter, a smoothing mask is preferably generated for adapting the filter, said smoothing mask predetermining a degree of smoothing for a plurality of different pixels (picture elements) or voxels (volume elements) of the tomogram corrected in terms of stray radiation or the plurality of tomograms corrected in terms of stray radiation, i.e. a value stating how strongly brightness differences between adjacent pixels or voxels should be equalized.

A particularly reliable method for forming such a smoothing mask is provided, in accordance with one embodiment of the method, by virtue of gradient values being formed of each tomogram afflicted by stray radiation and/or each tomogram corrected in terms of stray radiation.

As an alternative to smoothing the tomogram corrected in terms of stray radiation itself, the smoothing is based on an artifact map formed by means of the tomogram corrected in terms of stray radiation in a second variant of the method, i.e., an artifact map is initially estimated, said artifact map describing where stray radiation artifacts are present in the at least one tomogram afflicted by stray radiation. Then, this estimate, i.e. the artifact map, is smoothed in order hereby to improve the estimate of the stray radiation artifacts.

To this end, one embodiment of the method provides for the respective at least one tomogram afflicted by stray radiation and the respective at least one corresponding tomogram corrected in terms of stray radiation to be subtracted from one another for the purposes of forming the artifact map and for this (unsmoothed) artifact map to be subsequently smoothed by means of a filter. In order then to obtain an improved image of the object, a new noise-reduced and stray-radiation-corrected tomogram is formed by subtracting the filtered artifact map from the at least one tomogram afflicted by stray radiation.

Alternatively, in accordance with another embodiment, the artifact map is obtained from measurements which precede the projection image data records or from a data record which differs from the projection image data records, in particular a construction data record of a computed tomography scanner. By way of example, the construction data record can be a CAD (computer-aided design) plan. An advantage thereof is that the object is not required for establishing the artifact map and so the artifact map may be generated in advance and independently of the object.

As already explained above, the method, known per se from the prior art, may be used as correction method for forming the at least one preliminary tomogram corrected in terms of stray radiation. By way of example, use is preferably made of a subtraction-based stray radiation correction, by means of which an estimated stray signal is subtracted from the projection image data records. These methods permit a reliable first estimate of the stray radiation artifacts, from which it is possible to proceed by means of the disclosed method so as to obtain an improved estimate on the basis of the region-specific smoothing.

In the preceding description, a distinction was made between a rendering of the object on the one hand and the tomograms on the other hand. The reason for this is that the smoothed tomogram corrected in terms of stray radiation or the just described noise-reduced and stray-radiation-corrected new tomogram, as was formed by means of the filtered artifact map, need not necessarily be the ultimate rendering of the object. Rather, provision is preferably made for the ultimate tomogram or volume rendering to be established by virtue of the tomogram corrected in terms of stray radiation being formed by means of an iterative reconstruction method on the basis of the projection image data records and, in a plurality of, or all, iteration steps or iterations of this reconstruction method, the respective intermediate result, i.e. the tomogram corrected in terms of stray radiation or associated artifact map, being smoothed by means of the filter. In the latter case, the new tomogram is calculated in each case by means of the artifact map and it forms the basis of the subsequent iteration.

ART (algebraic reconstruction technique) methods, SART (simultaneous algebraic reconstruction technique) methods and statistical methods, such as e.g. a maximum likelihood reconstruction, were found to be suitable iterative construction methods. When use is made of smoothing filters, iterative methods are advantageous over methods based on back projection (e.g. the filtered back projection and the Feldkamp algorithm) in that they once again access the primary information from the measured projection image data records after each iteration step and therefore render it possible to correct structures which were previously smoothed too strongly, i.e. which were inadvertently smoothed away instead of e.g. stray radiation artifacts or other unwanted primary information, and so said primary information is better identifiable again.

As already explained above, the disclosed method is not restricted to a stray beam correction in individual tomograms. In accordance with a preferred embodiment of the method, the tomograms are gathered from a volume model afflicted by stray radiation and a volume model corrected in terms of stray radiation such that the latter is likewise improved in terms of the imaging accuracy as a result thereof.

Other embodiments provide a computed tomography scanner comprising a ray source for irradiating an object from different projection angles. By way of example, the computed tomography scanner can be based on x-rays, i.e. the ray source can be an x-ray source, or else it can be e.g. based on positrons. Moreover, the computed tomography scanner may comprise a ray detector for detecting the rays and generating a plurality of projection image data records of the trans-illuminated object. By way of example, such a ray detector can be an x-ray flat-panel detector.

The computed tomography scanner may include an analysis device to be configured to carry out an embodiment of the disclosed method on the basis of the projection data records. As a result of this, the computed tomography scanner may advantageously generate a volume corrected in terms of stray radiation or a tomogram corrected in terms of stray radiation, which exhibits a better noise behavior than what emerges without the noise reduction, during the reconstruction, i.e. when calculating the tomogram rendering or the 3D volume rendering of the object.

However, the application of the method is expressly not only restricted to the preparation of CT projection data but it can also be carried out for reducing noise in any projection data.

The exemplary embodiment explained below is one example embodiment of the invention. However, the described components of the embodiment each represent individual features of the invention which should be considered independently of one another, which each also develop the invention independently of one another, and which therefore should also be considered to be a component of the invention when on their own or in a different combination than the one shown. Moreover, the described embodiment is also able to be complemented by further features of the invention which have already been described.

FIG. 1 shows an embodiment of the computed tomography scanner, briefly tomography scanner 10, which may comprise an x-ray system 12, an analysis device 14 and a display device 16, e.g. a screen. By way of example, the x-ray system 12 may be an x-ray C-arm system, which may have a C-arm 18 which is rotatably mounted about an axis of rotation R and may have an x-ray source 20 arranged at one end and an x-ray detector 22, for example an x-ray flat-panel detector, arranged at the opposite end. By way of example, the analysis device 14 may be e.g. a processor device, such as a digital computational unit or computer.

By way of example, the body of a patient may be examined by means of the tomography scanner 10. In the shown example, the head 24 of a patient is rendered for illustrative purposes. However, the trans-illuminated object may also originate from the non-human sector. By way of example, it is possible to trans-illuminate and render e.g. components or materials or chemicals.

The x-ray system 12 can be used to obtain an x-ray recording from different projection angles in each case by operating the x-ray source 20 and receiving the projection of the head 24 by means of the x-ray detector 22. To this end, the C-arm 18 can be rotated in a desired angular interval of e.g. 0 degrees to 200 degrees about the axis of rotation R in a rotational movement 28 for the purposes of moving the x-ray source 20 along a travel W and for the purposes of actuating the projection angles and it can generate a respective recording of the head 24 at the appropriate angular positions.

By way of each recording, the x-ray detector 22 generates respective 2D x-ray image data P1, P2, P3, which are transferred to the analysis device 24. The recordings, i.e. the x-ray image data P1, P2, P3 and the x-ray image data generated at the further projection angles, which belong to a single pass, i.e. one rotational movement 28, are combined by the analysis device 24, for example by means of a back projection or Feldkamp reconstruction, to form a 3D volume model 30 which specifies the absorption property or attenuation property in respect of the x-ray radiation of the x-ray source 20 for individual voxels of the head 24. By way of example, a unit for such an attenuation value is HU (Hounsfield Unit).

By way of example, a tomogram 32 of the head 24 may be formed from the volume model 30, said tomogram being able to be displayed by means of the display device 16.

In the case of the tomography scanner 10, the volume model 30 has a particularly low stray beam component or artifact component and nevertheless has a similar, or the same, signal-to-noise ratio as the volume model which was formed without stray beam correction. To this end, the analysis device 14 can carry out one of the two methods explained below on the basis of FIG. 2 and FIG. 3.

Both of the methods explained below are based on a method for stray beam correction known from the prior art. By way of example, there may be a software-based solution, for example based on a Monte Carlo simulation approach, a deterministic calculation or any other variant already described above. There may also be a measurement-based stray beam determination, which may be based, for example, on a beam stop array or a temporal primary modulation (TPM).

All known subtraction-based stray beam correction methods generally supply two complete CT projection data records, each of which may render projection image data records with the two-dimensional image data of x-ray projections of the object in the manner described. Of these, one is e.g. a projection data record corrected in terms of a stray beam, which has a greater noise component, while the other projection data record is a CT data record without stray beam correction, but with less noise.

The goal of the methods described below lies in using an adaptive volume filter for noise reduction within an iterative CT reconstruction, for example according to an ART reconstruction approach, proceeding from the projections corrected in terms of stray radiation. The adaptive volume filter may consist of the local minimization of the total variation (TV), taking into account the data record afflicted by stray radiation. This means that stronger smoothing is applied in homogeneous regions than volume regions with structures. Here, the degree of smoothing can be determined with the aid of the data record afflicted by stray radiation.

In a first step, the subtraction-based stray beam correction method is initially used when recording the CT projections, i.e. the 2D x-ray image data P1, P2, P3, in both methods. This supplies the two aforementioned complete CT projection data records, a data record with projections corrected in terms of stray radiation and a further data record with projections afflicted by stray radiation.

In a second step, an iterative CT reconstruction is now applied to both projection data records. Thus, two volumes or volume models Funcorr, Fcorr emerge after each iteration step, wherein the volume model Funcorr is a volume model afflicted by scattering and the volume model Fcorr is a volume model corrected in terms of scattering. One of the aforementioned methods, that is to say, for example, an ART method, may underlie the iterative construction method.

Figure 2:
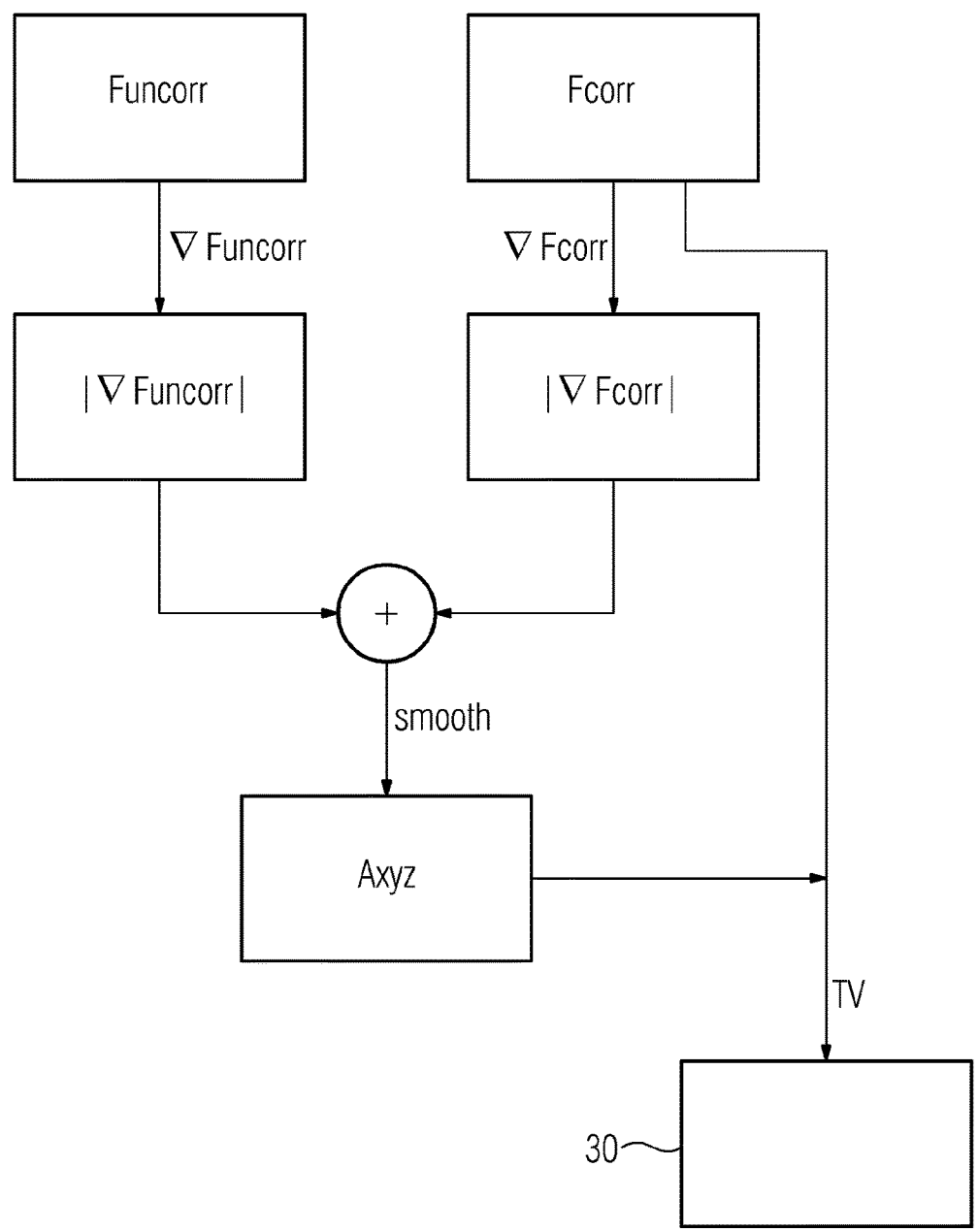
FIG. 2 shows a sketch for elucidating a first embodiment of the method according to the invention, as can be carried out by the computed tomography scanner in FIG. 1.
Figure 3:
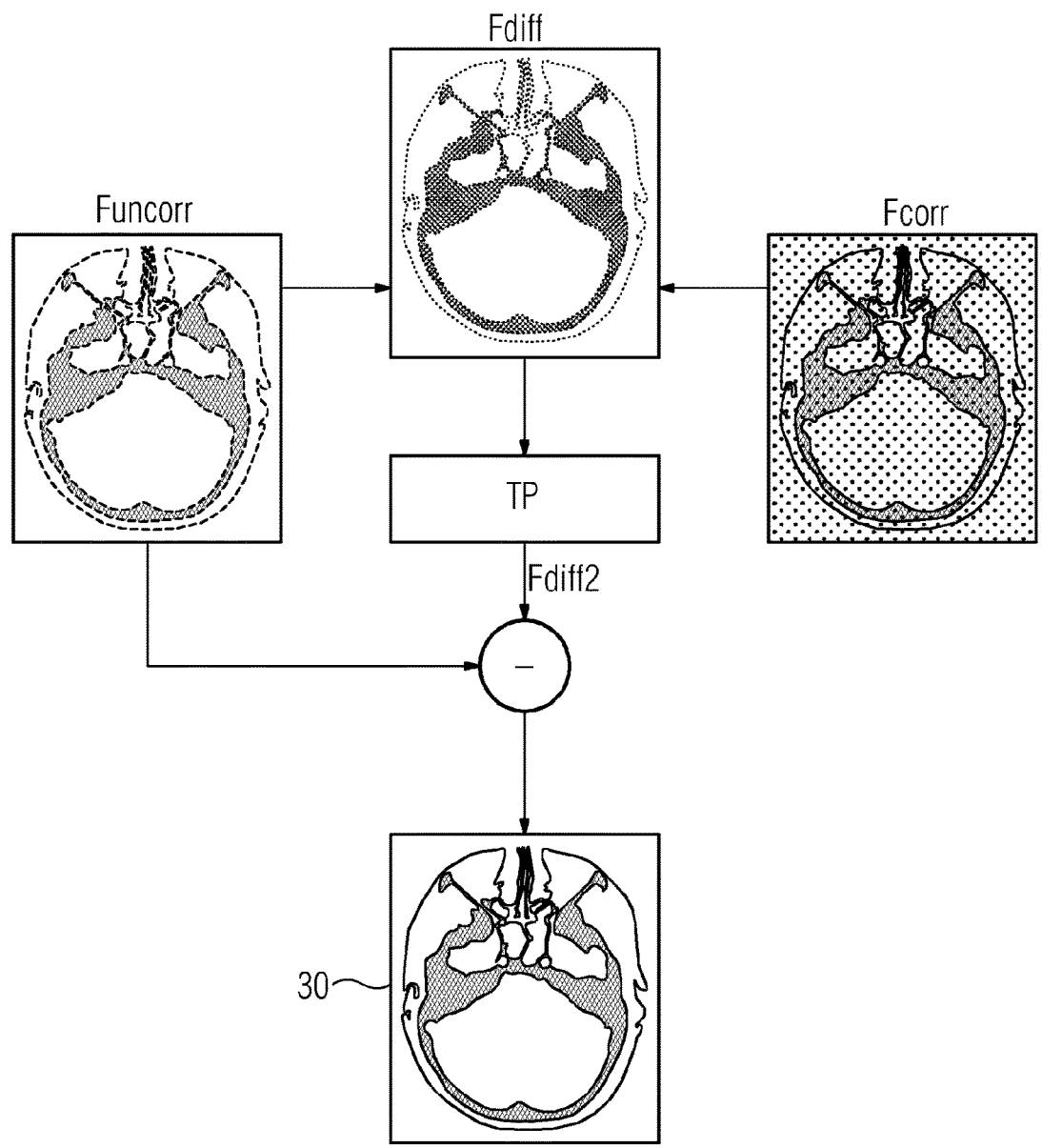
FIG. 3 shows a sketch for elucidating a second embodiment of the method according to the invention, as can be carried out by the computed tomography scanner in FIG. 1.

A third step may now be carried out in the manner elucidated in FIG. 2 or in the manner elucidated in FIG. 3.

In the first variant in accordance with FIG. 2, adaptive smoothing of the volume Fcorr corrected in terms of stray radiation may be carried out after each iteration. In this case, adaptive means the smoothing operation uses structure information from the uncorrected volume model Funcorr. This is explained in more detail below.

An edge-maintaining total variation filter may serve as a basis for the volume smoothing of the volume model Fcorr, as explained in more detail below. In a different context, a total variation filter is known for example from the publication by Sidky et al. (Emit Y Sidky, Chien-Min Kau, Xiaochuan Pan: "Accurate image reconstruction from few-use and limited-angle data in divergent-beam CT", Journal of X-ray Science and Technology, volume 14, pages 119-139, 2006).

The total variation (TV) of the volume model Fcorr corrected in terms of beams is minimized after each iteration step. Like in any type of volume filtering, there may be the risk that essential primary information, i.e. information about the structure of the imaged body, is likewise smoothed and can therefore only still be identified with difficulty. In order to prevent this, it is now possible to use the second volume model Funcorr not corrected in terms of stray beams. By correlating the two volume models Funcorr and Fcorr, it is now substantially possible to identify the following two regions in a volume model:

regions which contain essential structure information about the body 24 (e.g. a bone structure), local homogeneous regions, i.e. regions without significant structure information.

Pixels of an individual tomogram or voxels of a whole volume model which can be assigned to the second group (homogeneous region) are now smoothed more strongly than regions from the first group (structures). In order to distinguish the two regions from one another, it is possible to proceed as follows:

It is possible to calculate a smoothing mask Axyz according to the following formula:

$$Axyz = (|\nabla Funcorr|)_{smooth}.$$

According to this equation, the gradient of the attenuation values in both the volume models Fcorr and Funcorr (corrected in terms of stray radiation and not corrected in terms of stray radiation) is initially calculated, and the magnitudes of the gradients are subsequently added voxel-by-voxel or pixel-by-pixel. The volume model obtained therefrom can now be smoothed very strongly, which is expressed by the operator $(\ )_{smooth}$. By way of example, this smoothing can once again be achieved by minimizing the total variation of the sum. However, it is also possible to use a different smoothing algorithm for volume smoothing or 2D smoothing. This smoothing leads to a high or large value in regions with high gradients, i.e. large values of the absolute value of the gradient, and therefore essential structure information, and very low values in regions with little structure.

Subsequently, the volume model Fcorr corrected in terms of stray radiation can now be smoothed in a region specific manner on the basis of the smoothing mask Axyz by minimizing the total variation TV, which results in the following formula:

$$\|F\|_{TV} = \sum_{x,y,z} Axyz \cdot ((F_{x,y,z} - F_{x-1,y,z})^2 + (F_{x,y,z} - F_{x,y-1,z})^2 + (F_{x,y,z} - F_{x,y,z-1})^2)^{1/2}$$

where the specification $F_{xyz}$ denotes a voxel value of the volume model Fcorr, i.e. x,y,z specifies the coordinate or voxel order number in the volume model Fcorr. The value F specified in the formula above is minimized, which is expressed by $\|F\|_{TV}$. By way of example, minimization can be carried out by way of a gradient descent method. Suitable methods are sufficiently well known from the prior art.

The new volume model Fcorr corrected in terms of stray beams obtained thus can now be used as the basis for the next iteration of the iterative CT reconstruction. Then, the volume model 30 is obtained at the end of all iterations. By way of example, this may be based on more than 10, in particular more than 50, iterations.

As an alternative to the step of minimizing a value by means of the smoothing mask Axyz, the following variant can be carried out as third step, i.e. as second variant for generating a volume model 30 corrected in terms of stray beams with a high signal-to-noise ratio, for the purposes of which reference is made to FIG. 3.

The preceding step of calculating the two volume models Funcorr and Fcorr supplies two volumes after each iteration step, Fcorr, which is corrected in terms of stray beams, and Funcorr, which is not corrected. As already described above, the two 3D data records have the following properties: Funcorr has a high contrast-to-noise ratio with a normal noise component, which emerges from the measurement arrangement, and a high portion of stray beam artifacts, which are perceivable in axial layers, typically as (low frequency) radial gradients or shadow structures between high-contrast objects. Fcorr is largely free of stray beam artifacts, but has a higher image noise than Funcorr.

An alternative approach described now consists of fusioning the two volume models in such a way that, in each case, the advantageous image properties transfer into the result of the fusion. To this end, the low-frequency image components of the final volume model are adopted from Fcorr and the high-frequency image components thereof are adopted from Funcorr. In order to carry out this fusion robustly, the following method can be carried out:

A difference volume model Fdiff=Funcorr−Fcorr can be calculated in a step 3a. The difference volume model represents an artifact map, in which substantially only the artifact effects which arose by stray beams are visible. However, renderings of object structures of organs may still be contained as comparatively (spatially) high-frequency contrast profiles.

The image components of Fdiff, which cannot be identified as belonging to the artifact Fdiff, may be removed in a step 3b. In particular, the high-frequency image components of Fdiff are removed by application of a low-pass filter TP, wherein a 2D Gaussian filter or 2D median filter for tomograms and a corresponding 3D variant for filtering a whole volume model may be used here as an image filter. It is also possible to apply the minimization of the total variation on Fdiff again. The difference volume model filtered hereby is referred to here as Fdiff2.

The filtered difference volume model Fdiff2 now describes an improved estimate of the artifact component which was generated by the stray radiation.

Subsequently, in a step 3c, the initial, uncorrected volume model Funcorr can be corrected by subtracting the artifact volume Fdiff2 determined above. Hence, the fusioned image volume model can be calculated as:

$$F\text{final}=F\text{uncorr}-F\text{diff2}.$$

After the steps 3a, 3b and 3c, the final volume model Ffinal obtained from 3c is used in the now following iteration step of the iterative CT reconstruction as new volume model corrected in terms of stray beams. After the last iteration, the final volume model Ffinal present then represents the volume model 30.

Essentially, the three following improvements are provided by the two methods:

1) The method combination, which considers the corrected and uncorrected volume model such that the corrected noise behavior which can be identified in both volume models because these are the relevant structures of the body 24, is used to obtain region-specific smoothing.

2) This region-specific smoothing can be configured as locally varying for each pixel or voxel, in particular using the smoothing mask Axyz, such that the local structure density or detail density can be taken into account.

3) A further advantage arising from complementing, or embedding into, an iterative reconstruction method for x-ray tomography is that structures which were smoothed too strongly can be made visible again in the next iteration step because these are then adopted back into the volume model from the uncorrected projection image data in the next iteration.

One advantage of the disclosed method is that the adaptive smoothing of the corrected volume model resorts to the structure information of the uncorrected volume model. As a result of the principle thereof, the artifacts of the stray radiation are unsharp and do not change the edge information of small, sharply delimited structures of the body. As a result, these structures are obtained and can be gathered from the uncorrected volume model, without including stray radiation artifacts in the process. As a result, no artifacts are transferred back into the corrected volume model by the noise suppression.

Depending on the underlying method for determining the scattering correction, no additional measurement time is required in relation to a regular recording and almost the same noise behavior as in the uncorrected case is obtained despite the correction. The image structures are maintained to a large extent, even in the case of a low contrast-to-noise ratio, and are not removed from these image regions by the smoothing. The method is not restricted to a single method and can, as a matter of principle, be combined with all iterative reconstruction methods. Hence, a combination with further correction methods is also possible.

Overall, the exemplary embodiment thus describes a noise reduction in the case of a difference-based stray beam correction within the iterative CT reconstruction by means of adaptive total variation.

What is claimed is:

1. A method for reducing noise in a tomogram and/or volume rendering of an object, the method comprising:
receiving a plurality of projection image data records afflicted by stray radiation, based on the plurality of projection image data records afflicted by stray radiation, forming:
(a) at least one tomogram afflicted by stray radiation and having stray radiation artifacts, and
(b) at least one preliminary tomogram corrected with respect to stray radiation by a predetermined correction method,
using a filter to selectively smooth (a) noise in the at least one tomogram corrected in terms of stray radiation or (b) noise in an artifact map describing the stray radiation artifacts, based on an edge profile of the object imaged in the tomogram afflicted by stray radiation, and
smoothing the noise in the at least one tomogram corrected in terms of stray radiation in a region-specific manner by an adaptive filter in a manner dependent on the edge profile.

2. The method of claim 1, comprising generating a smoothing mask for adapting the filter, wherein the smoothing mask predetermines a degree of smoothing for a plurality of different voxels of the at least one tomogram corrected in terms of stray radiation.

3. The method of claim 2, comprising forming the smoothing mask from at least one of gradient values of each tomogram afflicted by stray radiation, or gradient values of each tomogram corrected in terms of stray radiation.

4. A method for reducing noise in a tomogram and/or volume rendering of an object, the method comprising:

receiving a plurality of projection image data records afflicted by stray radiation, based on the plurality of projection image data records afflicted by stray radiation, forming:
- (a) at least one tomogram afflicted by stray radiation and having stray radiation artifacts, and
- (b) at least one preliminary tomogram corrected with respect to stray radiation by a predetermined correction method, using a filter to selectively smooth (a) noise in the at least one tomogram corrected in terms of stray radiation or (b) noise in an artifact map describing the stray radiation artifacts, based on an edge profile of the object imaged in the tomogram afflicted by stray radiation, and forming the artifact map based on the tomogram afflicted by radiation and the tomogram corrected in terms of stray radiation, and smoothing the noise in the artifact map.

5. The method of claim 4, wherein the artifact map is formed based on a difference between the tomogram afflicted by stray radiation and the tomogram corrected in terms of stray radiation, and after the smoothing, a noise-reduced and stray-radiation-corrected new tomogram is formed by subtracting the filtered artifact map from the tomogram afflicted by stray radiation.

6. The method of claim 4, comprising forming the artifact map from the projection image data records of preceding measurements or from a data record that differs from the projection image data records.

7. The method of claim 4, wherein the filter is a total variance filter.

8. The method of claim 4, comprising using a subtraction-based stray radiation correction, in which an estimated stray signal is subtracted from the projection image data records, as a correction method for forming the at least one tomogram corrected in terms of stray radiation.

9. The method of claim 4, wherein the tomogram corrected in terms of stray radiation is formed using an iterative reconstruction method based on the projection image data records, and smoothed in a plurality of iterations by the adaptive filter.

10. The method of claim 9, wherein the iterative reconstruction method comprises an algebraic reconstruction algorithm (ART) method, a simultaneous algebraic reconstruction algorithm (SART) method, or a statistical method.

11. The method of claim 4, wherein the tomograms are gathered from a stray radiation afflicted and stray radiation corrected volume model of the object.

12. A computed tomography scanner, comprising:
a ray source configured to pass radiation through an object from different projection angles;
a ray detector configured to detect the rays and produce a plurality of projection image data records of the transilluminated object; and
an analysis device configured to form, based on the plurality of projection image data records detected by the ray detector:
- (a) at least one tomogram afflicted by stray radiation and having stray radiation artifacts, and
- (b) at least one preliminary tomogram corrected with respect to stray radiation by a predetermined correction method, use a filter to selectively smooth (a) noise in the at least one tomogram corrected in terms of stray radiation or (b) noise in an artifact map describing the stray radiation artifacts, based on an edge profile of the object imaged in the tomogram afflicted by stray radiation, forming the artifact map based on the tomogram afflicted by radiation and the tomogram corrected in terms of stray radiation, and smoothing the noise in the artifact map.

13. The method of claim 6, wherein the data record that differs from the projection image data records comprises a construction data record of a computed tomography scanner.

* * * * *